United States Patent
Norman et al.

(10) Patent No.: US 6,357,527 B1
(45) Date of Patent: Mar. 19, 2002

(54) ENCAPSULATED BREAKERS AND METHOD FOR USE IN TREATING SUBTERRANEAN FORMATIONS

(75) Inventors: Lewis R. Norman, Duncan, OK (US); Richard Turton, Morgantown, WV (US); Aashish L. Bhatia, Pittsburgh, PA (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/566,095

(22) Filed: May 5, 2000

(51) Int. Cl.[7] .............................................. E21B 43/26
(52) U.S. Cl. ..................... 166/300; 166/308; 507/224; 507/231; 507/902; 507/903; 507/921; 507/922
(58) Field of Search ................................ 166/280, 300, 166/308; 507/224, 225, 231, 269, 902, 903, 921, 922; 428/407

(56) References Cited

U.S. PATENT DOCUMENTS

| | | | |
|---|---|---|---|
| 3,163,219 A | 12/1964 | Wyant et al. | |
| 3,766,984 A | 10/1973 | Nimerick | |
| 3,952,741 A | 4/1976 | Baker | |
| 3,992,317 A | 11/1976 | Brichard et al. | |
| 4,182,417 A | 1/1980 | McDonald et al. | |
| 4,202,795 A | 5/1980 | Burchart et al. | |
| 4,211,688 A | 7/1980 | Tate | |
| 4,259,205 A | 3/1981 | Murphey | |
| 4,343,363 A | 8/1982 | Norton | |
| 4,451,387 A | 5/1984 | Tai | |
| 4,456,067 A | 6/1984 | Pinner, Jr. | |
| 4,506,734 A | * 3/1985 | Nolte | 166/308 |
| 4,532,123 A | 7/1985 | Gardner | |
| 4,560,486 A | 12/1985 | Hinkel | |
| 4,564,070 A | 1/1986 | Norton | |
| 4,604,218 A | 8/1986 | Dawson | |
| 4,610,795 A | 9/1986 | Norris et al. | |
| 4,624,795 A | 11/1986 | Dawson et al. | |
| 4,670,166 A | 6/1987 | McDougall et al. | |
| 4,671,972 A | 6/1987 | Schobel et al. | |
| 4,693,321 A | 9/1987 | Royer | |
| 4,741,401 A | 5/1988 | Walles et al. | |
| 4,756,844 A | 7/1988 | Walles et al. | |
| 4,770,796 A | 9/1988 | Jacobs | |
| 4,919,209 A | 4/1990 | King | |
| 4,923,753 A | 5/1990 | Walles et al. | |
| 5,102,558 A | 4/1992 | McDougall et al. | |
| 5,110,486 A | 5/1992 | Manalastas et al. | |
| 5,164,099 A | 11/1992 | Gupta et al. | |
| 5,187,011 A | 2/1993 | Manalastas et al. | |
| 5,188,654 A | 2/1993 | Manalastas et al. | |
| 5,192,615 A | 3/1993 | McDougall et al. | |
| 5,224,544 A | 7/1993 | Tjon-Joe Pin et al. | |
| 5,370,184 A | 12/1994 | McDougall et al. | |
| 5,373,901 A | 12/1994 | Norman et al. | |
| 5,437,331 A | 8/1995 | Gupta et al. | |
| 5,604,186 A | * 2/1997 | Hunt et al. | 166/300 X |
| 6,162,766 A | * 12/2000 | Muir et al. | 507/267 |
| 6,184,184 B1 | * 2/2001 | Amin et al. | 507/238 |
| 6,209,646 B1 | * 4/2001 | Reddy et al. | 166/300 |

FOREIGN PATENT DOCUMENTS

| | | |
|---|---|---|
| WO | 0193369 | 9/1996 |
| WO | WO 98/40606 | 9/1998 |
| WO | WO 99/61747 | 12/1999 |
| WO | WO 99/63199 | 12/1999 |

OTHER PUBLICATIONS

SPE 16900 "An Evaluation Of The Effects Of Environmental Conditions And Fracturing Fluids Upon The Long–Term Conductivity Of Proppants" G.S. Penny–STIM–Lab, Inc.
SPE 16901 "Fracturing Treatment Design Improved By Conductivity Measurements Under In–Situ Conditions" M.A. Parker & B.W. McDaniel SPE Members Halliburton Energy Services, Inc.
SPE 17541 "Accurate Design Of Fracturing Treatment Requires Conductivity Measurements At Simulated Reservoir Conditions" B.W. McDaniel and M.A. Parker Halliburton Energy Services, Inc.
SPE in Calgary, Jun. 10 to 13, 1990 "Encapsulated Breaker For Aqueous Polymeric Fluids" M.T. King, et al –Dowell Schlumberger.

\* cited by examiner

*Primary Examiner*—George Suchfield
(74) *Attorney, Agent, or Firm*—Robert A. Kent

(57) ABSTRACT

The present invention relates to a method of breaking an aqueous fracturing fluid comprising introducing said aqueous fracturing fluid into contact with an encapsulated viscosity reducing agent said encapsulated viscosity reducing agent comprising an aqueous fluid soluble breaker for said fracturing fluid encapsulated within a membrane comprising a partially hydrolyzed acrylic crosslinked with either an aziridine prepolymer or a carbodiimide, said membrane having an embrittlement effective amount of a micron sized particulate present therein and said membrane having been cured at a temperature of at least about 115° F., such that an aqueous fluid in said fracturing fluid can contact said breaker after fracture failure of said membrane to dissolve at least a portion of said breaker and break the fracturing fluid in contact therewith.

19 Claims, No Drawings

ENCAPSULATED BREAKERS AND METHOD FOR USE IN TREATING SUBTERRANEAN FORMATIONS

BACKGROUND OF THE INVENTION

1. Field of the Invention

The present invention relates to compositions and methods for treating subterranean formations. Specifically, the invention is directed to compositions used to break fracturing fluids utilized in the stimulation of subterranean formations.

2. Description of the Prior Art

It is common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and applying sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Usually a gel, an emulsion or a foam, having a proppant such as sand or other particulate material suspended therein is introduced into the fracture. The proppant is deposited in the fracture and functions to hold the fracture open after the pressure is released and the fracturing fluid flows back into the well. The fracturing fluid has a sufficiently high viscosity to retain the proppant in suspension or at least to reduce the tendency of the proppant to settle out of the fracturing fluid as the fracturing fluid flows along the created fracture. Generally, a gelation agent and/or an emulsifier is used to gel or emulsify the fracturing fluid to provide the high viscosity needed to realize the maximum benefits from the fracturing process.

After the high viscosity fracturing fluid has been pumped into the formation and fracturing of the formation occurred, it is desirable to remove the fluid from the formation to allow hydrocarbon production through the new fractures. Generally, the removal of the highly viscous fracturing fluid is realized by "breaking" the gel or emulsion or, in other words, by converting the fracturing fluid into a low viscosity fluid. Breaking the gelled or emulsified fracturing fluid has commonly been accomplished by adding a "breaker," that is, a viscosity-reducing agent, to the fracturing fluid prior to pumping into a subterranean formation. However, this technique can be unreliable and sometimes results in incomplete breaking of the fluid and/or premature breaking of the fluid before the fracturing process is complete. Premature breaking can decrease the number or length of fractures obtained and thus, the amount of hydrocarbon recovery. Further, it is known in the art that most fracturing fluids will break if given enough time at an elevated temperature. However, it is, of course, most desirable to return the well back to production as quickly as possible.

It has been demonstrated that the viscosifying polymer in a fracturing fluid is concentrated by a factor of from 5 to 20 times due to fluid loss during pumping and fracture closure. This concentrated polymer generally is referred to as "filter cake." For example, see G. S. Penney, "An Evaluation Of The Effects Of Environmental Conditions In Fracturing Fluids Upon The Long Term Conductivity Of Proppants," SPE 16900, presented at the 62nd Annual Technological Conference of SPE, Dallas, Tex., Sep. 27–30, 1987. Further, others have emphasized the effects of filter cake upon conductivity. For example, M. A. Parker and B. W. McDaniel, "Fracturing Treatment Designs Improved By Conductivity Measurements Under In-situ Conditions," SPE 16901, presented at the 62nd Annual Technological Conference of SPE, Dallas, Tex., Sep. 27–30, 1987; B. W. McDaniel and M. A. Parker, "Accurate Design and Fracturing Treatment Refines Conductivity Measurement At Reservoir Conditions," SPE 17541, presented at SPE Rocky Mountain Regional Meeting, Casper, Wyo., May 11–13, 1984. An unencapsulated breaker dissolves in the fluid and is lost along with the fluid during fluid loss. The dissolved breaker does not concentrate along with the filter cake concentration of the polymer and thus may not effectively break the filter cake. Therefore, damage to the resulting propped fracture may be permanent unless breaking subsequently occurs due to temperature degradation or dilution with formation fluids.

There have been several proposed methods for the breaking of fracturing fluids which were aimed at eliminating the above problems. For example, U.S. Pat. No. 4,202,795 discloses a method to release a chemical into an aqueous fluid by combining the chemical with a solid hydratable gelling agent and a breaker for the gel formed by the gelling agent when hydrated. The mixture is formed into prills or pellets, preferably having a size and range of from about 20 to about 40 mesh. (U.S. Sieve Series) From combining the pellets with an aqueous fluid into which the chemical is to be released, the gelling agent in the pellets hydrates and forms a protective gel around each of the pellets which prevents the release of the chemical into the aqueous fluid for the time period required for the protective gel to be broken by the gel breaker in the pellets. Once the gel breaker has broken the protective gel, the chemical in the pellets is released into the aqueous fluid. The time required for the protective gel to be broken is varied by varying the quantities of hydratable gelling agent and the gel breaker utilized in the pellets and by using different gelling agents and gel breakers.

U.S. Pat. No. 4,506,734 also provides a method for reducing the viscosity and the resulting residue of an aqueous or oil based fluid introduced into a subterranean formation by introducing a viscosity-reducing chemical contained within hollow or porous, crushable and fragile beads along with a fluid, such as a hydraulic fracturing fluid, under pressure into the subterranean formation. When the fracturing fluid passes or leaks off into the formation or the fluid is removed by back flowing, any resulting fractures in the subterranean formation close and crush the beads. The crushing of the beads then releases the viscosity-reducing chemical into the fluid. This process is dependent upon the closure pressure of the formation to obtain release of the breaker and is thus, subject to varying results dependent upon the formation and its closure rate.

U.S. Pat. No. 4,741,401 discloses a method for breaking a fracturing fluid comprised of injecting into the subterranean formation a capsule comprising an enclosure member containing the breaker. The enclosure member is sufficiently permeable to at least one fluid existing in the subterranean environment or injected with the capsule such that the enclosure member is capable of rupturing upon sufficient exposure to the fluid, thereby releasing the breaker. The patent teaches that the breaker is released from the capsule by pressure generated within the enclosure member due solely to the fluid penetrating into the capsule whereby the increased pressure caused the capsule to rupture, i.e., destroys the integrity of the enclosure member, thus releasing the breaker. This method for release of the breaker would result in the release of substantially the total amount of breaker contained in the capsule at one particular point in time.

In another method to release a breaker, U.S. Pat. No. 4,770,796 teaches or suggests an acid fracturing fluid composition comprising a polymer, a crosslinking agent for said polymer, an aqueous acid and a breaker compound capable of coordinating with titanium or zirconium crosslinking agent. The breaker compound is encapsulated in a composition comprising a cellulosic material and a fatty acid and optionally a wax.

Further, U.S. Pat. No. 4,919,209 discloses a proposed method for breaking a fluid. Specifically, the patent discloses a method for breaking a gelled oil fracturing fluid for treating a subterranean formation which comprises injecting into the formation a breaker capsule comprising an enclosure member enveloping a breaker. The enclosure member is sufficiently permeable to at least one fluid existing in the formation or in the gelled oil fracturing fluid injected with the breaker capsule, such that the enclosure member is capable of dissolving or eroding off upon sufficient exposure to the fluid, thereby releasing the breaker.

U.S. Pat. No. 5,164,099 discloses a proposed method for breaking a fluid utilizing a percarbonate, perchlorate or persulfate breaker encapsulated with a polyamide. The polyamide membrane is permeable to at least one fluid in the formation which dissolves the breaker and the breaker then diffuses through the membrane to break the fracturing fluid with the membrane staying intact during the breaker release.

U.S. Pat. No. 5,373,901 discloses a method for breaking a viscosified fluid utilizing an aqueous soluble breaker encapsulated within a membrane comprising a partially hydrolyzed acrylic crosslinked with either an aziridine prepolymer or a carbodiimide. The membrane has imperfections through which an aqueous fluid can diffuse inwardly through the membrane to dissolve at least a portion of the breaker and then diffuse outwardly from the encapsulated breaker to contact and break the fracturing fluid with the membrane staying intact during the breaker release. The imperfections can be created in the membrane by the addition of particulate material such as silica to the coating during the formation of the membrane coating.

PCT Application WO 99/61747 discloses a method for breaking a fluid utilizing a breaker encapsulated within a hydrolytically degradable polymer coating. The hydrolytically degradable polymer reacts with the water to chemically break down the coating to predominately non-solid components in a time and temperature range appropriate for the intended use. A preferred polymer coating is poly (alkyl-2-cyanoacrylate).

There remains a need for a method for the controlled breaking of fracturing fluids which is more economical, minimizes breaker loss during fluid loss to the formation and provides not only controlled release of the breaker, but also reduces damage to the formation and facilitates well cleanup.

SUMMARY OF THE INVENTION

The present invention relates to a method for controllably breaking an aqueous based fracturing fluid utilized to stimulate a subterranean formation. The present invention is further directed to an encapsulated viscosity reducing agent which is capable of providing controlled release at elevated pH in aqueous-based fracturing fluids. The encapsulated viscosity reducing agent comprises agglomerated particles of a viscosity reducing agent, which may also be referred to as a breaker, enclosed within an inert membrane that is subject to brittle fracture when exposed to subterranean formation closure pressure whereby the formation fluids may contact the viscosity reducing agent after membrane failure to dissolve the viscosity reducing agent in the membrane into the fracturing fluid. The fracturable membrane stays substantially intact until the period of release of the breaker, thereby providing controlled release.

Using the method of the present invention there is provided a means of controllably releasing amounts of a breaker within a proppant pack within a subterranean formation. The present method provides an encapsulation membrane which is capable of functioning in an aqueous based fluid at temperatures of from 60° F. to about 300° F. and at a fluid pH of up to at least about 12 without premature release of the breaker into the fluid.

DESCRIPTION OF THE PREFERRED EMBODIMENT

The method and composition of the present invention provides a means of breaking an aqueous linear or crosslinked fracturing fluid used to stimulate a subterranean formation.

The crosslinked aqueous fracturing fluid is prepared by hydrating a polymer such as guar, hydroxyalkylguar, hydroxyalkylcellulose, carboxyalkylhydroxyguar, carboxyalkylhydroxyalkylguar, cellulose or other derivatized cellulose, xanthan and the like in an aqueous fluid to which is added a suitable crosslinking agent. Suitable crosslinking agents include compounds such as borates, zirconates, titanates, pyroantimonates, aluminates and the like. Generally, the encapsulated breaker of the present invention can be added to any aqueous fracturing fluid generally known in the art. In the practice of the present invention the encapsulated breaker can be injected with the fracturing fluid or, if added to a carrier fluid, injected into a subterranean formation prior to, simultaneously with or subsequent to injection of the fracturing fluid. Generally, the encapsulated breaker will be admixed with fracturing fluid and a proppant material prior to introduction into the subterranean formation. If a carrier fluid is utilized, it can comprise substantially any of the aqueous liquids utilized to form fracturing fluids.

The encapsulated breaker of the present invention is made using known microencapsulation techniques. The encapsulated breaker can be made utilizing a fluidized bed process. One version of this method is referred to as the Würster process and a modification of such process utilizes a top spray method. Equipment to effect the coating is available from, for example, Glatt Air Techniques, Inc. Ramsey, N.J.

The breaker which is enclosed by the encapsulant can be substantially any material which does not adversely interact or chemically react with the encapsulation coating to destroy its utility. The breaker material can comprise, for example, enzymes such as hemicellulase on an inert substrate, oxiders such as sodium or ammonium persulfate, organic acids or salts, such as citric acid or a citrate, fumaric acid, liquids adsorbed on a solid substrate, solid perborates, solid peroxides or other oxidizers, mixtures of two or more materials and the like.

The encapsulating material comprises a partially hydrolyzed acrylic, preferably in an aqueous based form which is crosslinked with either an aziridine prepolymer or a carbodiimide. More particularly, the term partially hydrolyzed acrylic as used herein means any of the vinyl acrylic latex polymers containing from about 0–60% by weight monovinyl aromatic content as styrene, from about 5–25% by weight alpha, beta unsaturated carboxylic acid content and from about 15–95% by weight alkyl acrylate or methacrylate ester content. The unsaturated carboxylic acid can comprise, for example, acrylic acid or methyl acrylic acid or mixtures thereof. The alkyl acrylate or methacrylate ester can comprise, for example ethyl butyl or 2-ethylhexyalacrylate, methyl, butyl or isobutyl methacrylate or mixtures thereof. The vinyl acrylic latex polymers are stabilized by the addition of appropriate nonionic or anionic/nonionic surfactant systems in accordance with well-known methods for preparing and stabilizing latex polymer systems. Vinyl acrylic latex polymers of the type described above are commercially available from, for example, Rohm and Haas Company, Philadelphia, Pa. or S. C. Johnson Wax, Racine, Wis.

The aziridine prepolymer can comprise, for example, pentaerythritol-tris-[β-(aziridinly) propionate]. The carbodiimide can comprise, for example, 1,3-dicyclohexylcarbodiimide.

The partially hydrolyzed acrylic encapsulating material is admixed with a particulate micron sized material such as silica prior to or simultaneously with coating of the breaker. The acrylic is admixed with the particulate silica in an amount such that the particulate comprises from about 20 to about 80 percent by weight of coating solids present. Preferably, the silica comprises from about 50 to about 70% by weight of coating solids present. The particulate silica can have a size range of from about 1 micron to about 15 microns. Preferably the silica has a median particle size of from about 2 to about 3 microns and preferably contains less than 33 percent, by weight, sub-micron sized particles. The presence of substantial quantities of sub-micron sized particles has been found to adversely effect the performance of the encapsulated breaker of the present invention resulting in unregulated release of large quantities of breaker after exposure to a fracturing fluid.

The crosslinking agent is admixed with the partially hydrolyzed acrylic and silica in an amount of from about 1 to about 5 percent by weight of total coating solids present. Preferably, the crosslinking agent is present in an amount of from about 2.5 to 3.5 percent by weight of total coating solids.

When utilized in a fluidized bed coating process the encapsulated breaker coating is advantageously utilized in the form of an aqueous or solvent-based solution or dispersion which sometimes may be referred to as a latex which may contain from about 40 to about 60 percent by weight solids to facilitate spray coating of the breaker. Preferably the encapsulated breaker will have an encapsulant coating in an amount of from about 6 to about 70 percent by weight of the encapsulated breaker. Most preferably, the coating will comprise from about 35 to about 55 percent by weight of the encapsulated breaker depending upon the rate of release desired.

In the practice of the present invention, depending upon the temperature of the formation to be treated and the desired break time of the fracturing fluid, the encapsulated breaker may be present in an amount of from about 0.1 to in excess of 50 pounds per 1000 gallons of fracturing fluid. The encapsulated breakers of the present invention also may be utilized in a fracturing fluid with quantities of unencapsulated breakers, depending upon the specific break time desired.

As previously indicated, the encapsulated breakers are made by well known fluidized bed encapsulation techniques wherein the particles of breaker are sprayed with the encapsulant while suspended in a flow of air or other gas within a spray chamber. To maintain product uniformity with respect to performance, prior to encapsulation of the breaker material, the breaker preferably is sized to remove a substantial portion of any fines or clumps of breaker particles and provide a starting material with a particle size of from about 100 to 900 μm. In this manner, the subsequently prepared agglomerated encapsulated breaker will have, within a relatively narrow range, generally similar breaker release control properties. Generally, the encapsulated breaker is prepared by forming agglomerates of the breaker having a membrane coating of the crosslinked partially hydrolyzed acrylic and silica emulsion coating mixture of a certain average percentage to obtain the desired controlled release of the breaker for a particular fracturing fluid. The quantity of and size of the particulate silica present in the sprayed coating will significantly affect the permeability of the membrane created. The size of the agglomerated encapsulated breaker particles varies depending upon the desired amount of breaker to be released and the desired rate at which the breaker is to be released. Preferably, the agglomerates have an average particle size of from about 1 to 3 mm and most preferably about 1.25 to 2.5 mm. This however can be modified by changing the operating conditions during the coating process. Generally, it is preferred that the size of the agglomerated encapsulated breaker particles should be close to or slightly larger than that of the proppant, if any, present in the fracturing fluid. This further minimizes any formation damage that may result from introduction of the fracturing fluid into a subterranean formation. However, it is to be understood that particles having a size smaller than the proppant also may be utilized.

In the present invention, the breaker encapsulated within the coating membrane is primarily released from within the membrane by brittle fracture failure of the agglomerate coating. Fluid, upon fracture failure of the membrane, contacts the core of the particle whereupon it dissolves the breaker. The released breaker solution contacts the fracturing fluid whereupon it subsequently breaks the fracturing fluid.

The addition of the in-excess-of one micron mean diameter particles to the partially hydrolyzed acrylic coating causes the coating to be more brittle to facilitate the fracture failure release process. While the specific description set forth hereinabove has referred to particulate silica as the particulate additive to the coating, it is believed that any inert particulate of a similar particle size also could be utilized. The silica merely represents one commercially available preferred material. Examples of other suitable particulates would include calcium carbonate, titanium dioxide, barium sulfate and calcium sulfate or the like.

After formation of the coated agglomerates of the encapsulated breaker material, the encapsulated breaker preferably is subjected to a period of elevated temperature to further cure the membrane coating. Preferably, the membrane coating is cured at a temperature of from about 115° F. to about 145° F. for from about 1 hour to several days before use of the breaker. The elevated temperature curing has been found to improve the release rate of the breaker upon crushing of the material in the formation and assist in preventing early release prior to the desired release time within the formation.

The encapsulated breaker of the present invention has been surprisingly discovered to exhibit effective release rate control at pH's above 7. The release rate control is believed to result from the use of the crosslinker with the partially hydrolyzed acrylic. The crosslinking process is believed to prevent or assist in minimizing the caustic "swelling" of acrylics which is well known to those individuals skilled in the art of applying acrylic-type film coatings. The crosslinked coating has been found to effectively control the rate of release of the breaker when contained in an aqueous fracturing fluid having a pH of from about 2 to about 12.

The controlled release of the breaker from the encapsulated breaker of the present invention is effected without substantial leaching of the breaker through the membrane prior to the period in which a majority of the breaker is released. The breaker is released either by contact with the aqueous fluid contained in the fracturing fluid or any other aqueous fluid which may contact the encapsulated breaker after brittle fracture failure of the membrane within the subterranean formation or wellbore penetrating the formation.

To further illustrate the present invention, and not by way of limitation, the following Examples are presented.

EXAMPLE I

About 1000 grams of 20–40 mesh (U.S. Sieve Series) ammonium persulfate was placed in a Wurster fluidized bed apparatus. The Würster unit was set up to provide bottom spray within the draft tube. A 1.07 mm nozzle was utilized. The coating material was applied at a coating agent temperature of 40–45° C., an atomizing air pressure of 40 psi, an air rate of 25 to 40 scfm and a spray flow rate of 10 ml/min. Initially, the bed was loaded with a weighed amount (1000 g) of particles through an input port located at the top of the bed. The blower, such as a Fuji Ring Compressor Model # VFC904A-7W, was turned on and the flow rates were adjusted for the inside and the outside air. Next the heater was turned on. The required temperature was obtained by adjusting a temperature controller, such as a Antunes TCE Temperature Controller and Indicator Model #2408PL-04W-B40. After 10–15 minutes the fluidizing air had heated the bed of particles to the desired temperature. The atomizing air was turned on and adjusted to the required pressure and the desired flowrate. The coating liquid then was continuously applied. This involved pumping the liquid from a stirred container via a peristaltic pump, such as a Masterflex C/L Compact Dual-Channel Pump Model # P-77120-60, to the nozzel placed in the bed. Once the coating was applied, the heater was turned off and the blower was run for from about 10–15 minutes to cool the product within the unit. Next the coated particles were removed from the discharge port located above the distributor plate within the Würster unit.

The coating agent was prepared by adding 557 grams of water to 1071 grams of the partially hydrolyzed acrylate/silica mixture of the present invention. The mixture contained 30.7% silica, by weight, and 20.5% acrylate resin. Thereafter, 25 grams of a crosslinker comprising an aziridine prepolymer, present as a 50% solution, was added to the mixture and the coating then was applied. Using the above formulation, an encapsulated product was produced having a 45%, by weight, coating.

The release profile of the sample was determined using the following procedure. A sample comprising 0.11 grams of the encapsulated breaker and 11 grams of 20/40 mesh Carbo-Prop™ proppant was immersed in 50 cc of water and continuously stirred at room temperature. After a given time, samples were removed and the samples were analyzed for persulfate using iodometric titration methods. The release profile is set forth below in Table I.

TABLE I

Release Profile For Encapsulated Ammonium Persulfate At Room Temperature

| Time, Minutes | Ammonium Persulfate released, % |
|---|---|
| 0 | 0.0 |
| 2 | 0.0 |
| 5 | 0.24 |
| 10 | 0.84 |
| 15 | 1.11 |
| 30 | 5.71 |
| 60 | 6.73 |

EXAMPLE II

To determine the fracturability of the coating under an applied stress, such as subterranean formation closure pressure, the following test was performed. A test mixture comprised of 0.11 grams of encapsulated breaker and 11 grams of 20/40 mesh Carbo-Prop™ proppant was placed in a test cylinder of 7.62 cm diameter. A piston 8.9 cm long, which was a loose fit inside the cylinder, was placed on top of the loaded particle charge and the whole assembly was placed in a hydraulic press. A load of 62,720 N (14100lbf) was applied which corresponded to an average applied stress of about 13.8 Mpa (2000 psi). The load was applied over a period of one minute until a value of 62,720 N was reached, and then the pressure was held constant for two minutes. This procedure corresponds to the procedure identified as American Petroleum Institute RP 56: Procedure for Testing Frac Sand, Section 8 and Recommended Frac Sand Crush Resistance Test, 1994. The extent to which particles were broken was determined by measuring the concentration of ammonium persulfate released into water over 10 minutes using an iodometric titration procedure. The release of the breaker is set forth in the Table, below:

TABLE II

| Time, minutes | Ammonium Persulfate Released, % |
|---|---|
| 0 | 0.0 |
| 2 | 40.6 |
| 5 | 43.1 |
| 10 | 46.7 |

The foregoing results clearly demonstrate the effect that applied stress has on the fracture of the coating.

EXAMPLE III

To determine the effect of elevated temperature curing of the encapsulated breaker, the following test was performed. Samples were prepared and cured at room temperature for two days and at 60° C. The test procedures of Examples I and II were utilized to determine the percent of ammonium persulfate released through leaching and crushing. The results are set forth below:

TABLE III

Effect of Temperature Curing on Release of Ammonium
Persulfate for Coating Level of 10% by Weight Acrylate

| | Temperature = Ambient | | Temperature = 60° C. | |
|---|---|---|---|---|
| Time, minutes | Leach before compression | Leach after compression | Leach before compression | Leach after compression |
| 0 | 0. | 0. | 0. | 0. |
| 2 | 11.36 | 30.3 | 5.05 | 29.03 |
| 5 | 14.94 | 35.1 | 10.28 | 47.97 |
| 10 | 19.73 | 41.2 | 14.37 | 49.44 |

The results clearly demonstrate that curing ces the rate of leaching release of the breaker from the encapsulated breaker and improves the rate of crush release thereby providing a means of regulating the rate of release from the encapsulated breaker.

EXAMPLE IV

To determine the effect the particulate concentration in the coating has upon the release rate of the ammonium persulfate from the encapsulated breaker samples were prepared with the particulate concentration set forth below. The particulate comprised silica with a 2.1 mean particle diameter. The samples had a 15 or 25% coating, by weight, of partially hydrolyzed acrylic. The test procedures of Examples I and II were utilized and the samples were collected at 10 minutes. The results are set forth below in Table IV.

TABLE IV

| | % Ammonium Persulfate Released after 10 minutes | | | |
|---|---|---|---|---|
| Particulate Concentration In | Leaching | | Compression | |
| Coating, % | 15% | 25% | 15% | 25% |
| 0 | 4.35 | 8.97 | 40.55 | 23.87 |
| 20 | 3.46 | 3.88 | 49.41 | 30.04 |
| 40 | 14.09 | 2.84 | 51.69 | 33.62 |
| 60 | 14.14 | 3.53 | 73.92 | 66.62 |
| 80 | 65.53 | 20.95 | 56.49 | 61.64 |

The results of the tests clearly demonstrate that the presence of the particulate in the coating affects the rate of encapsulated material release.

While that which is considered to comprise the preferred embodiments of the present invention has been described herein, it is to be understood that various other modifications will be apparent to and can be readily made by those skilled in the art without departing from the spirit or scope of the present invention as set forth in the appended claims.

What is claimed is:

1. A method of breaking an aqueous fracturing fluid introduced into a subterranean formation comprising introducing under pressure a viscosity reducing agent encapsulated with a membrane comprising a partially hydrolyzed acrylic crosslinked with either an aziridine prepolymer or a carbodiimide, which is admixed with a particulate micron sized material to form said membrane, said membrane having been cured after formation at a temperature in excess of 115° F. before introduction with said fluid into said formation with said aqueous fracturing fluid, and reducing said introduction pressure so any resulting fractures in said formation at least partially close upon said encapsulated viscosity reducing agent and fracture at least a portion of the encapsulated agent particles whereby said aqueous fracturing fluid can contact said viscosity reducing agent to release at least a portion of said viscosity reducing agent in contact therewith.

2. The method of claim 1 wherein said membrane is cured at a temperature in the range of from about 115 to 145° F. for at least about 1 hour.

3. The method of claim 1 wherein said viscosity reducing agent comprises at least one member selected from the group of sodium persulfate, ammonium persulfate, potassium persulfate, citric acid, fumaric acid, hemicellulase enzyme and perborates.

4. The method of claim 1 wherein said micron sized particulate is present in an amount of at least about 20 percent of said coating.

5. The method of claim 4 wherein said micron sized particulate has a mean particle diameter of from 2 to about 3 microns and comprises silica.

6. The method of claim 4 wherein at least a portion of said micron sized material has a particle size in the range of from about 1 to about 15 microns.

7. The method of claim 1 wherein said azridine prepolymer comprises pentaerythritol-tris-[β-(aziridinly) propionate].

8. The method of claim 1 wherein said aziridine prepolymer is present in an amount of from about 2.5 to about 3.5 percent by weight of said partially hydrolyzed acrylic and micron sized particulate.

9. The method claim 1 wherein said aziridine prepolymer is present in an amount of from about 1 to about 5 percent by weight of said partially hydrolyzed acrylic and micron sized particulate.

10. The method of claim 1 wherein said fracturing fluid has a pH in the range of from about 2 to about 12.

11. A method of breaking an aqueous fracturing fluid having a pH in excess of about 7 and assisting in removing filter cake produced from said fracturing fluid within a subterranean formation comprising introducing at an elevated pressure into said formation to contact said fracturing fluid and filter cake in said formation an encapsulated breaker, said encapsulated breaker comprising a breaker for said fracturing fluid enclosed within a membrane comprising a partially hydrolyzed acrylic crosslinked with either an aziridine prepolymer or a carbodiimide, said membrane including a quantity of an in-excess-of 1 micron particulate in said membrane, said membrane being cured for at least about 1 hour at a temperature in the range of from about 115° F. to 145 F. prior to introduction into said subterranean formation, said membrane being fracturable such that said breaker can be released from said membrane into the fracturing fluid to break the fracturing fluid upon a reduction in the introduction pressure.

12. The method of claim 11 wherein said breaker comprises at least one member selected from the group of sodium persulfate, ammonium persulfate, potassium persulfate, citric acid, fumaric acid, hemicellulase enzyme and perborates.

13. The method of claim 11 wherein said micron sized particulate has a mean particle diameter of from about 2 to about 3 microns and comprises silica.

14. The method of claim 11 wherein said aziridine prepolymer comprises pentaerythritol-tris-[β-(aziridinly) propionate].

15. The method of claim 11 wherein said aziridine prepolymer is present in an amount of from about 1 to about 5 percent by weight of said partially hydrolyzed acrylic and micron sized particulate.

16. The method of claim 11 wherein said encapsulated breaker and fracturing fluid are introduced together into said subterranean formation.

17. A method of breaking an aqueous fracturing fluid and assisting in removing filter cake produced therefrom during treatment of a subterranean formation comprising introducing into said formation being fractured with at least a portion of said fracturing fluid an encapsulated breaker, said encapsulated breaker comprising an aqueous soluble breaker for said fracturing fluid encapsulated within a membrane comprising a partially hydrolyzed acrylic crosslinked with either an aziridine prepolymer or a carbodiimide, said membrane containing an embrittlement effecting amount of an in excess of 1 micron sized silica particulate, said membrane having been cured at a temperature of at least about 115° F., such that said membrane is subject to brittle fracture whereby said breaker encapsulated thereby may be dissolved by an aqueous fluid contacting exposed breaker subsequent to fracture of said membrane.

18. The method of claim 17 wherein said breaker comprises at least one member selected from the group of sodium persulfate, ammonium persulfate, potassium persulfate, citric acid, fumaric acid, hemicellulase enzyme and perborates.

19. The method of claim 17 wherein at least a portion of said micron sized material has a particle size in the range of from about 1 to about 15 microns.

* * * * *